United States Patent Office 3,062,763
Patented Nov. 6, 1962

3,062,763
COMPOSITION COMPRISING (1) A REACTION PRODUCT OF AN ALDEHYDE AND THE CONDENSATION PRODUCT OF A POLYGLYCIDYL ETHER AND AN ACRYLAMIDE COPOLYMER, (2) AN UNSATURATED ESTER COPOLYMER, AND (3) A POLYESTER RESIN
Norman G. Gaylord, New Providence, N.J., assignor to Interchemical Corporation, New York, N.Y., a corporation of Ohio
No Drawing. Filed Feb. 26, 1960, Ser. No. 11,135
16 Claims. (Cl. 260—22)

This invention relates to new thermosetting coating compositions. More particularly, it relates to coating compositions comprising blends of low molecular weight organic solvent soluble acrylic copolymers, new resins formed by the alkylolation of the condensation products of acrylamides and epoxy resins and polyester resins.

The resulting compositions are heat curable to yield very durable surface coatings which are well cured, hard, flexible, display good color and gloss and good color and gloss retention even after extensive curing by baking and rebaking. In addition, these surface coatings display an excellent resistance to weathering, solvents, salt spray, soaps and detergents.

The new composition of this invention comprises essentially a blend of three major components.

A. The reaction product of an (1) aldehyde and (2) the condensation product of a polyglycidyl ether of a polyhydric compound and a copolymer comprising an acrylamide and at least one other ethylenically unsaturated monomer.

B. An acrylic copolymer made by the addition polymerization of a mixture of monomers comprising from 5% to 30% by weight of a non-allylic alcohol containing the norborene nucleus and an ethylenically unsaturated ester material having the formula

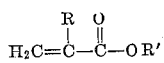

in which R is either hydrogen, methyl or ethyl and R' is an alkyl radical of 1 to 8 carbons.

C. A polyester resin comprising the reaction product of (1) an aromatic dicarboxylic acid such as isophthalic acid or products formed by the condensation of terpenes with maleic anhydrides (2) alphabeta ethylenic dicarboxylic acids such as maleic anhydride and fumaric acid or aliphatic dicarboxylic acids having a chain length of 6–10 carbons, (3) an aliphatic monocarboxylic acid having a chain length of 8 to 12 carbon atoms, (4) a dihydric alcohol and (5) a polyhydric alcohol having at least 3 hydroxyl groups.

The novel alkylolated acrylamide-epoxy resin condensation products comprise the reaction products of aldehyde and the condensation products of copolymers containing acrylamides and at least one other ethylenically unsaturated monomer with epoxy resins.

The acrylamide containing copolymers used in this invention may be prepared by any of the conventional methods well known to those skilled in the art. U.S. Patent No. 2,173,005, issued September 12, 1939, to Daniel E. Stain gives one process for preparing acrylamide containing copolymers. Acrylamide monomers may be copolymerized with a wide variety of ethylenically unsaturated monomers including acrylic or methacrylic acids and their esters, particularly methyl acrylate, ethyl acrylate, butyl acrylate, hexyl acrylate and octyl acrylate; nitriles of acrylic and methacrylic acids; vinyl halides; styrene and vinyl toluene; maleic acid and esters thereof; vinyl ethers; vinyl acetones, particularly methyl vinyl ketone; dibutyl maleate; vinyl pyridines; 2-chloro-butadiene-1,3 etc. It will be obvious to those skilled in the art that mixtures of the above monomers may be copolymerized with acrylamide monomers to give copolymers of widely varying properties. In other words by the proper selection of monomers and proportions, acrylamide containing copolymers may be made to have specific hardness and flexibility characteristics. In the practice of this invention, it is preferred to use acrylamide copolymers containing substantial amounts of either styrene, vinyl or toluene and ethyl acrylate or methyl methacrylate. The proportions are not critical. It is also preferable to include small quantities of methacrylic or acrylic acid.

In producing the alkylolated acrylamide-epoxide condensation product of this invention, the acrylamide monomer is first copolymerized with the other ethylenically unsaturated monomers. The resulting acrylamide containing copolymer is then condensed with an epoxide resin. Finally the aldehyde is reacted with the condensation product.

The entire reaction is preferably conducted in solution. The selected solvent must be one in which the acrylamide, the ethylenically unsaturated monomers, the epoxide resin and the aldehyde must be soluble. Aliphatic alcohols as methanol, ethanol and butanol are preferable as solvents with butanol being the most preferable of these. Ethylene glycol monobutyl ether and acetone may also be used as solvents either alone or in combination with other solvents. It should be noted that the preferred solvents may be cut or mixed with aromatic hydrocarbon solvents such as xylene.

The copolymerization of the monomers to form the acrylamide copolymers is initiated by "catalysts" or polymerization initiators of the free radical type. The most commonly used initiators are azo compounds and organic peroxygen compounds. Typical of the azo compounds that may be used for this purpose are azobisisobutyronitrile, and azobisisovaleronitrile. Typical of the organic peroxygen compounds that may advantageously be used as copolymerization initiators are such compounds as cumene hydroperoxide, teritary butyl perbenzoate, peracetic acid, acetyl peroxide, perbenzoic acid, benzoyl peroxide, lauroyl peroxide, stearoyl peroxide, ditertiary butyl peroxide, tertiary butyl hydroperoxide, methyl ethyl ketone-hydrogen peroxide adduct, and cyclohexanone-hydrogen peroxide adduct.

It is desirable that the acrylamide copolymers have a low molecular weight in order to insure solubility thereof in the solvent used for the coating compositions of this invention. Accordingly, it is preferable to add "chain stoppers" during the polymerization of the acrylamide copolymer. Mercaptans such as dodecyl mercaptans, hexyl mercaptans and octyl mercaptans are conventionally used.

The epoxy resins condensed with the acrylamides are conventionally prepared by reacting a polyhydric phenol, particularly Bisphenol A with epichlorohydrin. Bisphenol A is a mixture of 4,4'-dihydroxy diphenyl dimethyl methane with lesser quantities of its 2,2'-isomer and its 4,2'-isomer. By regulating the proportions of these two reactants the molecular size and the molecular structure of the epoxy resins may be controlled. By using an excess of epichlorohydrin, the lower molecular weight epoxy resins are produced. By increasing the amount of Bisphenol A used, higher molecular weight epoxy resins are produced. In the practice of the invention, it is preferable to employ epoxy resins having molecular weights below 900. The most preferable epoxy resin is one having a molecular weight of 850–900, an epoxide equivalent weight of 485 and a hydroxyl equivalent weight of 145, such as "Epon 1001."

While there are no critical limitations on the proportions of epoxy resin condensed with the acrylamide copolymer, best results are obtained when the epoxy resin amounts to 10% or less based upon solids content of the total weight of the reactants. It is most preferable to condense about 5% by weight of epoxy resin with the remainder being acrylamide copolymer. The condensation reaction is preferably catalyzed by a catalyst such as triethylamine.

While formaldehyde is used in methylolating the condensation product, it will be obvious that other aldehydes may be used to alkylolate the condensation product. While not critical, it is preferable to react 2 equivalents of formaldehyde for every 1 equivalent of acrylamide in the copolymers.

It should be noted that in the case of reactions which are conducted in alkanol solvents such as butanol in the present case, the alkylol groups or methylol groups on the final product become etherified to alkoxyalkyl groups or in the case where formaldehyde is used in butanol, the condensation product is butoxymethylated.

Where formaldehyde is to be used for methylolation in a butanol solvent, it has been found to be commercially convenient to use a commercial product known as Butyl Formcel which is a butanol solution containing 40% by weight of formaldehyde.

The norbornene nucleus containing acrylic copolymers are defined in copending application Serial No. 768,839, filed October 22, 1958, now Patent No. 2,985,611, as a low molecular weight organic solvent soluble acrylic copolymer product by the addition polymerization of a mixture of monomers comprising (1) a minor portion of a non-allylic alcohol containing the norbornene nucleus, (2) a major proportion of an ester or a mixture of esters selected from the group consisting of the alkyl esters of acrylic and methacrylic acid in which the alkyl groups contain from one to eight carbon atoms. The non-allylic alcohol containing the norbornene nucleus will ordinarily constitute about 5–30% of the copolymerization mixture, and the $C_1$–$C_8$ alkyl esters of acrylic and/or methacrylic acids will usually constitute from about 50% to about 95% of the copolymerization mixture. Preferably, there will also be present in the copolymerization mixture certain modifiers in amount about 2–35%. These modifiers include acids such as acrylic and methacrylic; nitriles, such as acrylonitrile and methacrylonitrile; vinyl esters, such as vinly acetate, vinyl propionate and vinyl stearate; esters of unsaturated dibasic acids, such as dimethyl maleate and dibutyl fumarate; styrene, alpha-methyl styrene, and the various vinyl toluenes; amides, such as acrylamide, methacrylamide, methylolacrylamide, and methylol-methacrylamide; hydroxy compounds such as ethylene glycol monoacrylate or monomethacrylate, glycerol monoacrylate or monomethacrylate or glycerol allyl ether, and vinyl alkyl ethers such as vinyl butyl ether, vinyl ethyl ether, vinyl hexyl ether, etc.

With respect to the non-allylic alcohols containing the norbornene nucleus it should be noted that norbornene has the formula:

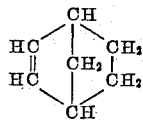

While for the purposes of describing the present invention, reference will be made mostly to copolymers of 2-hydroxymethyl-5-norbornene which has the following structure.

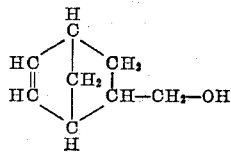

it will be understood that related homologs can readily be used and it is intended that the appended claims will cover the use of such compounds.

2-hydroxymethyl-5-norbornene is readily prepared by reacting allyl alcohol with cyclopentadiene (U.S. Patent No. 2,596,279 and No. 2,352,606) Alkyl substituted cyclopentadienes behave similarly to yield corresponding substituted derivatives. Likewise compounds containing two alcoholic hydroxyl groups can be obtained by condensing an unsaturated diol, such as butenediol with cyclopentadiene.

These acrylic copolymers are prepared in solution by addition polymerization initiated by conventional free radical type initiators which have been described fully hereinabove. Benzoyl peroxide is preferably used as an initiator in the polymerization. Xylene is preferably used as the solvent although other conventional solvents such as benzene, ethyl benzene or toluene may be used.

In a further embodiment of this invention epoxy resin-acrylic graft copolymers which are more fully described in copending application Serial No. 808,887, April 24, 1959, may be used in place of the acrylic copolymers. These graft copolymers are prepared by the above described method for preparing the norbornene nucleus containing acrylic copolymers and using the same ingredients except that said monomers are polymerized by addition polymerization in the presence of epoxy resins.

The epoxy resins used in preparing the graft copolymers of application Serial No. 808,887 are conventionally prepared by reacting a polyhydric phenol, particularly Bisphenol A with epichlorohydrin. By regulating the proportions of these two reactants, the molecular size and the molecular structure of the ethoxyline resins produced may be controlled. By using an excess of epichlorohydrin, a low molecular weight ethoxyline resin is produced. By increasing the amount of Bisphenol A used, higher molecular weight epoxy resins produced. In the preparation of these graft copolymers, it is preferable to use epoxy resins having molecular weights of 350 to 875, epoxide equivalent weights of 175 to 525 and an average of 1.7 to 1.9 epoxides per molecule. We have found best results are secured when epoxy resins having a molecular weight of 875, an epoxide equivalent weight of 485 and an average of 1.7 to 1.9 epoxide groups per molecule are used. One available commercial resin having these preferred properties is "Epon 1001" marketed by the Shell Corporation. While it is not critical, it is preferred to have the epoxy resin constitute 9 to 37% parts by weight of the total starting reactants in the preparation of the graft copolymer.

The polyester resins blended with the above described ingredients to provide the coating composition of this invention comprises the esterification product of the following components. It should be noted that the proportions are not considered to be critical. The ranges given are those which yield the most desirable results.

(1) Aromatic dicarboxylic acid 26 to 32% by weight includes isophthalic acid and phthalic anhydride. The Petrex acids, which are resinous polybasic acids formed by the condensation of terpenes with maleic anhydride may be used in place of the aromatic acids.

(2) 7–10% by weight of an alpha-beta ethylenic dicarboxylic acid such as maleic anhydride and fumaric acid or 7–10% by weight of aliphatic dicarboxylic acids having a chain length 6–10% carbons such as adipic, azelaic and sebacic acids.

(3) 23–32% by weight of an aliphatic monocarboxylic acid having a chain length of 8–12. These include caprylic, pelargonic, capric and lauric acids.

(4) 13–29% by weight of a dihydric alcohol such as 1,3 butylene glycol, neopentylglycol and 1,4 butandiol.

(5) 9–22% by weight of a polyhydric alcohol having at least 3 hydroxyl groups. These include trimethylol ethane trimethylol propane, and 1,2,6 hexanetriol.

The polyester resins are prepared in solution with xylene, benzene or toluene being the preferred solvents.

In preparing the novel blends of this invention solutions of the alkoxyalkylated acrylamide-epoxy resin condensation products are blended with solutions of the acrylic copolymers or acrylic-epoxy resin graft copolymers and solutions of the polyester resins. While not critical it is preferable to blend the three components in the following ratios which are given by weight on a solids basis:

|  | Parts by weight |
|---|---|
| Alkoxyalkylated acrylamide epoxy resin condensation product | 4 to 3 |
| Polyester resin | 1 to 2 |
| Acrylic copolymer or acrylic-epoxy resin graft copolymer | 1 to 4 |

It should also be noted that the novel compositions of this invention have excellent pigment dispersing properties and that these may be readily pigmented to yield pigmented coatings upon curing.

The following examples will illustrate the practice of this invention.

EXAMPLE 1

|  | G. |
|---|---|
| Petrex acids | 774 |
| Maleic anhydride | 177 |
| Pelargonic acid | 570 |
| Neopentyl glycol | 699 |
| Trimethylol ethane | 240 |
| Xylene | 246 |

All the ingredients are charged into a flask and heated to the temperature of 165–170° C. at which water is azeotropically distilled. The temperature is slowly raised over a period of 5 hours to 230–240° C., and held at that temperature for approximately an additional 5 hours until an acid number of 11–13 is reached. The solids content is adjusted with xylene to a 60% solids content by weight. The solution has a Gardner-Holdt viscosity at 25° C. of L or 3.00 poises.

EXAMPLE 2

|  | G. |
|---|---|
| A. Isophthalic acid | 229 |
| B. Fumaric acid | 104 |
| C. Lauric acid | 360 |
| D. Neopentyl glycol | 169.5 |
| E. Trimethylol ethane | 216 |
| F. Xylene | 57 |

Ingredients A, B, C, D and E are charged into a flask and heated under an air cooled condenser and $CO_2$ atmosphere to 165°–170° C. The temperature is then raised to 235°–240° C. over a 3 hour period and the mixture is maintained at that temperature until it is clear. The solution is then cooled to 170° C. and F is added. Water is then removed by azeotropic distillation which is continued until the solution has an acid value of 9–11. The product is cooled and sufficient xylene is added to adjust the solid content of the product to a 60% solids content by weight. The product solution has a Gardner-Holdt viscosity of G–H.

EXAMPLE 3

|  | G. |
|---|---|
| A. Isophthalic acid | 299 |
| B. Adipic acid | 131 |
| C. Pelargonic acid | 288 |
| D. Neopentyl glycol | 169.5 |
| E. Trimethylol ethane | 216 |
| F. Xylene | 55 |

Ingredients A, B, C, D and E are charged into a flask and heated under a $CO_2$ atmosphere with an air cooled condenser to 165°–170° C. The temperature of the mixture is then raised to 235°–240° C. over a period of 3 hours and maintained at this level until the mixture is clear. The resulting solution is then cooled to 170° C. and F is added. Water is then removed by azeotropic distillation which is continued until the solution has an acid number of 9. Sufficient xylene is added to adjust the solids content of the product to 60% solids by weight. The product solution has a Gardner-Holdt viscosity of E.F.

EXAMPLE 4

|  | G. |
|---|---|
| A. Isophthalic acid | 299 |
| B. Fumaric acid | 104 |
| C. Pelargonic acid | 288 |
| D. Neopentyl glycol | 169 |
| E. 1,2,6-hexane triol | 241 |
| F. Xylene | 55 |

The procedure of Example 3 is repeated using the above ingredients. The product solution has a Gardner-Holdt viscosity of M–N.

EXAMPLE 5

|  | G. |
|---|---|
| A. Isophthalic acid | 299 |
| B. Fumaric acid | 104 |
| C. Pelargonic acid | 288 |
| D. Neopentyl glycol | 192 |
| E. Trimethylol propane | 220 |
| F. Xylene | 55 |

The procedure of Example 3 is repeated using the above ingredients. The product solution has a Gardner-Holdt viscosity of E–F.

EXAMPLE 6

|  | Lbs. |
|---|---|
| Isophthalic acid | 20.5 |
| Fumaric acid | 7.11 |
| Pelargonic acid | 19.70 |
| 1.3 butylene glycol | 9.99 |
| Trimethylol ethane | 14.80 |
| Xylene | 2.88 |

The procedure of Example 3 is repeated using the above ingredients.

EXAMPLE 7

|  | G. |
|---|---|
| Group A: |  |
|   Acrylamide | 180 |
|   Butanol | 600 |
| Group B: |  |
|   Styrene | 900 |
|   Ethyl acrylate | 84 |
|   Methacrylic acid | 36 |
|   Xylene | 600 |
|   Cumene hydroperoxide | 12 |
|   Tert-dodecyl mercaptan | 12 |
| C. Tert-dodecyl mercaptan | 12 |
| D. Tert-butyl perbenzoate | 6 |
| Group E: |  |
|   Epon 1001 | 44.4 |
|   Triethylamine | 0.2 |
| F. Butyl Formcel | 380 |

The acrylamide of Group A is dissolved in the butanol of said group by heating and agitation. Groups A and B are mixed and heated to 120° C. at which temperature refluxing commences. After the reaction mixture is maintained at reflux for one hour, C is added. After 3 additional hours at reflux, D is added and refluxing is continued for another 2 hours. Group E is added and refluxing is continued for 1 hour. F is added and the reflux temperature is maintained for 3 hours while the water is removed by azeotropic distillation. The final solids content is 45.9% by weight and the Gardner-Holdt viscosity is V+.

EXAMPLE 8

Group A:                                         G.
   Vinyl toluene _____ 93.75
   Ethyl acrylate _____ 8.75
   Methacrylic acid _____ 3.75
   Acrylamide _____ 18.75
   Butanol _____ 62.5
   Xylene _____ 62.5
   Cumene hydroperoxide _____ 1.25
   Tert-dodecyl mercaptan _____ 1.25
B. Tert-dodecyl mercaptan _____ 1.25
C. Tert-butyl perbenzoate _____ .62
Group D:
   Epon 1001 _____ 4.6
   Triethylamine _____ .02
E. Butyl Formcel _____ 39.0

Group A is heated to reflux at about 123° C., for 1 hour. B is added and heating at reflux continued for 3 hours. C is then charged and heating at reflux is continued for 2 hours. The solids content after 6 hours of reflux is 47.1% by weight and the resin solution has a Gardner-Holdt viscosity of X–Y. Group D is added and a reflux temperature of 114° C. is maintained for 1 hour. E is charged and water is removed by azeotropic distillation a period of 3 hours. The final solids content is 46.8% by weight and the Gardner-Holdt viscosity is X–Y.

EXAMPLE 9

Group A:                                         G.
   Styrene _____ 500.00
   Ethyl acrylate _____ 320.00
   Methacrylic acid _____ 30.0
   Acrylamide _____ 150.0
   Butanol _____ 500.0
   Xylene _____ 500.0
   Cumene hydroperoxide _____ 10.0
   Tert-dodecyl mercaptan _____ 10.0
B. Tert-butyl perbenzoate _____ 5.0
Group C:
   Epon 1001 _____ 69.0
   Triethylamine _____ 0.32
D. Butyl Formcel _____ 318.0

Group A is heated to reflux at approximately 115° C. and maintained at said level for 4 hours. B is added and heating at reflux is continued for 2 more hours. The total solids content after the 6 hour reaction period is 44.6% by weight and the resin solution has a Gardner-Holdt viscosity of Z. Group C is added and reflux temperature of 114° C. is maintained for 1 hour. D is added and water is removed by azeotropic distillation for 3 hours. The final solids content is 42% by weight and the Gardner-Holdt viscosity is Z2–Z3.

EXAMPLE 10

Group A:                                         G.
   2-hydroxymethyl-5-norbornene _____ 89.0
   Xylene _____ 246.0
Group B:
   Butyl acrylate _____ 362.0
   Methyl methacrylate _____ 21.4
   Methacrylic acid _____ 21.4
   Xylene _____ 246.9
   Benzoyl peroxide _____ 9.9
C. Benzoyl peroxide _____ 2.5

Group A is heated with stirring under nitrogen atmosphere to 90° C. Group B is added dropwise over a period of 1½ hours while the temperature is maintained at 90° C., with intermittent cooling, if necessary. C is added 1½ hours after the completion of the dropwise addition of B. The temperature is maintained at 90° C. for an additional 1½ hours and then the temperature is raised to 125° C. for 1 hour to destroy residual catalyst. The final copolymer solution has a 45.4% non-volatile content by weight indicating a 90.8% conversion of monomers to polymer.

EXAMPLE 11

Group A:                                         G.
   2-hydroxymethyl-5-norbornene _____ 324
   Xylene _____ 900
Group B:
   Butyl acrylate _____ 1320
   Methyl methacrylate _____ 78
   Methacrylic acid _____ 78
   Xylene _____ 900
   Benzoyl peroxide _____ 36
C. Benzoyl peroxide _____ 9

Group A is heated under a nitrogen atmosphere to 90° C. Group B is added dropwise over a period of 2.5 hours while maintaining the temperature at 90° C. C is added 30 minutes after the completion of the addition of B. After an additional 1.5 hours, for a total of 4.5 hours, at 90° C., the temperature is raised to 125° C. for one hour to destroy residual catalyst. The total solids, determined on a 1–2 g. sample at 177° C. for one hour, is 44.7% by weight indicating an 89.4% conversion of monomers to polymer.

EXAMPLE 12

Group A:                                         G.
   2-hydroxymethyl-5-norbornene _____ 135.0
   Xylene _____ 450.0
Group B:
   Ethyl acrylate _____ 675.0
   Methacrylic acid _____ 90.0
   Xylene _____ 450.0
   Benzoyl peroxide _____ 18.0
C. Benzoyl peroxide _____ 4.5
D. Benzoyl peroxide _____ 4.5
E. Benzoyl peroxide _____ 4.5

Group A is heated with stirring under a nitrogen atmosphere to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for 3 more hours at which time D is added. The temperature is maintained at 90° C. for 3 hours at which time E is added. The temperature is maintained at 90° C. for 3 hours. The temperature is then raised to 125° C. for one hour to destroy residual catalyst. The final copolymer solution has a 46.4% nonvolatile content by weight indicating a 92.8% conversion to polymer.

EXAMPLE 13

Group A:                                         G.
   2-hydroxymethyl-5-norbornene _____ 90.0
   Xylene _____ 450.0
Group B:
   Butyl acrylate _____ 315.0
   Methyl methacrylate _____ 270.0
   Ethyl hexyl acrylate _____ 180.0
   Methacrylic acid _____ 45.0
   Xylene _____ 450.0
   Benzoyl peroxide _____ 18.0
C. Benzoyl peroxide _____ 4.5
D. Benzoyl peroxide _____ 4.5

Group A is charged into the reaction vessel and heated with stirring under a nitrogen atmosphere to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for an additional 3 hours at which time D is added. The temperature is maintained at 90° C. for 3 more hours at which time the temperature is raised to 125° C. for 1 hour to destroy residual catalyst. The final copolymer solution has a 46.3% non-volatile content indicating a 92.6% conversion of monomers to polymer.

EXAMPLE 14

|   | G. |
|---|---|
| A. Epon 1001 | 450 |
| B. 2-hydroxymethyl-5-norbornene | 270 |
| C. Xylene | 750 |
| D. Butyl acrylate | 1100 |
| E. Methyl methacrylate | 65 |
| F. Methacrylic acid | 65 |
| G. Xylene | 750 |
| H. Benzoyl peroxide | 30 |
| I. Benzoyl | 7.5 |

A, B, and C are heated to 90° while continually stirring under a nitrogen atmosphere. D, E, F, G and H are mixed and the mixture is added dropwise to the A, B and C mixture over a period of 2½ hours while the temperature is maintained at 90° C. The mixture is maintained at 90° C. for ½ hour and I is added. The mixture is maintained at 90° C. for 1½ hours after which the mixture is raised to 125° C. and maintained at that temperature for 1 hour. The solids content of the product is 54.4% by weight.

EXAMPLE 15

1 part by weight of the polymer resin prepared in Example 1 is blended with 2 parts by weight of the acrylic copolymer prepared in Example 10 and 7 parts by weight of the acrylamide copolymer prepared in Example 7. The resulting blend is drawn down on a steel panel and baked at 350° F. for 30 minutes. The baked film is well cured, hard, clear, flexible, and displays high gloss and good color as well as high resistance to soaps, solvents and detergents.

The blend of this example may be pigmented with any of the standard enamel varnish pigments. 60 parts by weight of the blend are mixed with 40 parts by weight of TiO₂ pigment, drawn down on a steel panel and baked in accordance with the above schedule. The resulting film displays properties equivalent to those of the unpigmented film, and in addition, 2 panels having the cured pigmented film when rebaked at 204° C. for 1 additional hour displays excellent color retention.

The following blends listed in Table I, when prepared and cured in accordance with the procedure described in Example 15 provide cured films having properties equivalent to those of the films described in Example 15, both in the pigmented and unpigmented state.

Table I

| Blends | Polyester resin prepared in— | Parts by Weight | Acrylic Copolymer prepared in— | Parts by Weight | Acrylamide copolymer Prepared in— | Parts by Weight |
|---|---|---|---|---|---|---|
| Example 16 | Ex. 1 | 1 | Ex. 10 | 1 | Ex. 7 | 8 |
| Example 17 | Ex. 1 | 1 | Ex. 11 | 2 | Ex. 7 | 7 |
| Example 18 | Ex. 1 | 1 | Ex. 11 | 1 | Ex. 7 | 8 |

The following blends listed in Table II are prepared in accordance with the procedure described in Example 15 as unpigmented films. These cured films display properties equivalent to those of the film of Example 15.

Table II

| Blends | Polyester resin prepared in— | Parts by Weight | Acrylic Copolymer Prepared in— | Parts by Weight | Acrylamide copolymer Prepared in— | Parts by Weight |
|---|---|---|---|---|---|---|
| Example 19 | Ex. 2 | 2 | Ex. 10 | 4 | Ex. 7 | 4 |
| Example 20 | Ex. 3 | 2 | Ex. 10 | 4 | Ex. 7 | 4 |
| Example 21 | Ex. 4 | 2 | Ex. 10 | 4 | Ex. 7 | 4 |
| Example 22 | Ex. 5 | 2 | Ex. 10 | 4 | Ex. 7 | 4 |
| Example 23 | Ex. 6 | 2 | Ex. 10 | 4 | Ex. 7 | 4 |
| Example 24 | Ex. 2 | 1 | Ex. 12 | 2 | Ex. 8 | 7 |
| Example 25 | Ex. 4 | 1 | Ex. 13 | 2 | Ex. 9 | 7 |

Table III lists blends having epoxy resin containing acrylic graft copolymers. Films of these blends when drawn down and cured in accordance with the procedure set forth in Example 15 provide films having properties equivalent to the properties of the films of Example 15.

Table III

| Example | Polyester resin prepared in— | Parts by Weight | Graft Copolymer Prepared in— | Parts by Weight | Acrylamide copolymer Prepared in— | Parts by Weight |
|---|---|---|---|---|---|---|
| 26 | Ex. 1 | 1 | Ex. 14 | 2 | Ex. 7 | 7 |
| 27 | Ex. 1 | 1 | Ex. 14 | 1 | Ex. 7 | 8 |
| 28 | Ex. 2 | 2 | Ex. 14 | 4 | Ex. 7 | 4 |
| 29 | Ex. 3 | 2 | Ex. 14 | 4 | Ex. 7 | 4 |
| 30 | Ex. 4 | 2 | Ex. 14 | 4 | Ex. 7 | 4 |
| 31 | Ex. 1 | 1 | Ex. 14 | 4 | Ex. 7 | 5 |

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of this invention.

What is claimed is:

1. A thermosetting composition comprising
   (A) the reaction product of (1) a lower molecular weight aliphatic monoaldehyde and (2) the condensation product of a polyglycidyl ether of a polyhydric compound and a copolymer of acrylamide and at least one other ethylenically unsaturated monomer.
   (B) an acrylic copolymer made by the addition polymerization of a mixture of monomers comprising from 5% to 30% by weight of a non-allylic alcohol containing the norbornene nucleus and an ethylenically unsaturated ester material having the formula

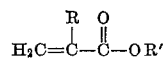

in which R is a member selected from the group consisting of hydrogen, methyl and ethyl and R' is an alkyl radical containing from 1 to 8 carbon atoms, and
   (C) a polyester resin comprising the reaction product of (1) dicarboxylic acid selected from the group consisting of isophthalic acid and resinous polybasic acids formed by the condensation of terpenes with maleic anhydride (2) an acidic member selected from the group consisting of maleic anhydride, fumaric acid and adipic acid (3) an aliphatic monocarboxylic acid selected from the group consisting of pelargonic acid and lauric acid (4) a dihydric alcohol selected from the group consisting of neopentyl glycol and 1,3 butylene glycol and (5) a polyhydric alcohol having at least 3 hydroxyl groups selected from the group consisting of trimethylol ethane, trimethylol propane and 1,2,6 hexane triol.

2. A thermosetting composition as defined in claim 1, wherein said acrylic copolymer is polymerized in the presence of 9% to 37% by weight of an epoxy resin having the formula

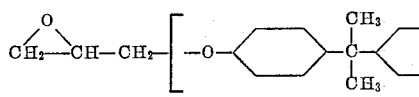

where $n$ is an integer from 0 to 2.

3. A thermosetting composition according to claim 1, wherein said acrylic copolymer comprises the addition polymerization product of a mixture of monomers comprising 2-hydroxymethyl-5-norbornene, butyl acrylate, methyl methacrylate and further includes methacrylic acid.

4. The thermosetting composition defined in claim 3, which is polymerized in the presence of 9% to 37% by weight of an epoxy resin having the formula

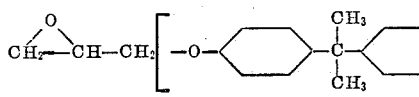

5. A thermosetting resin according to claim 1, wherein one of the reactants is the reaction product of formaldehyde and the condensation product of a polyglycidyl ether of a polyhydric alcohol having an average molecular weight of 875, an epoxide equivalent weight of 485 and a hydroxyl equivalent weight of 145 and a copolymer of styrene, ethyl acrylate methacrylic acid and acrylamide.

6. A thermosetting resin according to claim 1, wherein one of the reactants is the reaction product of formaldehyde and the condensation product of a polyglycidyl ether of a polyhydric alcohol having an average molecular weight of 875, an epoxide equivalent weight of 485 and a hydroxyl equivalent weight of 145 and a copolymer of vinyl toluene, ethyl acrylate, methacrylic acid and acrylamide.

7. A thermosetting composition according to claim 1, wherein said polyester resin comprises the reaction product of isophthalic acid, lauric acid, neopentyl glycol trimethylol ethane and fumaric acid.

8. A thermosetting composition according to claim 1, wherein said polyester resin comprises the reaction prod-

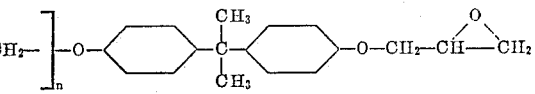

uct of a resinous polybasic acid formed by the condensation of terpene and maleic anhydride, pelargonic acid, neopentyl glycol, trimethylol ethane and maleic anhydride.

9. A surface coating composition comprising a volatile organic solvent solution of the composition defined in claim 1.

10. A surface coating composition comprising a volatile organic solvent solution of the composition defined in claim 2.

11. A surface coating composition comprising a vola-

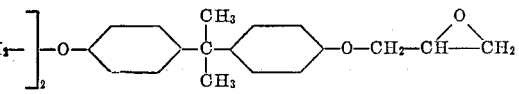

tile organic sovent solution of the composition defined in claim 3.

12. A surface coating composition comprising a volatile organic solvent solution of the composition defined in claim 4.

13. A surface coating composition comprising a volatile organic solvent solution of the composition defined in claim 5.

14. A surface coating composition comprising a volatile organic solvent solution of the composition defined in claim 6.

15. A surface coating composition comprising a volatile organic solvent solution of the composition defined in claim 7.

16. A surface coating composition comprising a volatile organic solvent solution of the composition defined in claim 8.

No references cited.